US009143445B2

(12) United States Patent
Cheng et al.

(10) Patent No.: US 9,143,445 B2
(45) Date of Patent: *Sep. 22, 2015

(54) METHOD AND SYSTEM FOR LINK AGGREGATION ACROSS MULTIPLE SWITCHES

(71) Applicant: BROCADE COMMUNICATIONS SYSTEMS, INC., San Jose, CA (US)

(72) Inventors: Joseph Juh-En Cheng, Palo Alto, CA (US); Wing Cheung, Fremont, CA (US); John Michael Terry, San Jose, CA (US); Suresh Vobbilisetty, San Jose, CA (US); Surya P. Varanasi, Dublin, CA (US); Parviz Ghalambor, Los Altos, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/889,637

(22) Filed: May 8, 2013

(65) Prior Publication Data
US 2013/0308649 A1 Nov. 21, 2013

Related U.S. Application Data

(63) Continuation of application No. 13/092,864, filed on Apr. 22, 2011, now Pat. No. 8,446,914.

(60) Provisional application No. 61/352,720, filed on Jun. 8, 2010.

(51) Int. Cl.
*H04L 12/721* (2013.01)
*H04L 12/46* (2006.01)
(Continued)

(52) U.S. Cl.
CPC ............ *H04L 45/66* (2013.01); *H04L 12/4625* (2013.01); *H04L 12/4633* (2013.01); *H04L 45/00* (2013.01); *H04L 45/245* (2013.01); *H04L 49/70* (2013.01); *Y02B 60/33* (2013.01)

(58) Field of Classification Search
CPC ................ H04L 12/56; H04L 12/5601; H04L 2012/5619; H04L 2012/562; H04L 2012/5623; H04L 2012/5627; H04L 45/58; H04L 45/586; H04L 45/60; H04L 49/70
USPC .............. 370/351, 389, 392, 395.1, 396, 397, 370/398, 399, 395.3, 400, 401
See application file for complete search history.

(56) References Cited

U.S. PATENT DOCUMENTS 5,390,173 A 2/1995 Spinney
5,802,278 A 9/1998 Isfeld
(Continued)

FOREIGN PATENT DOCUMENTS

CN 102801599 A 11/2012
EP 0579567 5/1993
(Continued)

OTHER PUBLICATIONS

"Switched Virtual Internetworking moves beyond bridges and routers", 8178 Data Communications 23(Sep. 1994) No. 12, New York, pp. 66-70, 72, 74, 76, 78, 80.
(Continued)

*Primary Examiner* — Chi H Pham
*Assistant Examiner* — Weibin Huang
(74) *Attorney, Agent, or Firm* — Shun Yao; Park, Vaughan, Fleming & Dowler LLP

(57) ABSTRACT

One embodiment of the present invention provides a switch. The switch includes a forwarding mechanism and a control mechanism. During operation, the forwarding mechanism forwards frames based on their Ethernet headers. The control mechanism operates the switch in conjunction with a separate physical switch as a single logical switch and assigns a virtual switch identifier to the logical switch, wherein the virtual switch identifier is associated with a link aggregation group.

20 Claims, 7 Drawing Sheets

(51) Int. Cl.
*H04L 12/701* (2013.01)
*H04L 12/709* (2013.01)
*H04L 12/931* (2013.01)

(56) References Cited

U.S. PATENT DOCUMENTS

| | | | |
|---|---|---|---|
| 5,878,232 A | 3/1999 | Marimuthu | |
| 5,959,968 A | 9/1999 | Chin | |
| 5,973,278 A | 10/1999 | Wehrill, III | |
| 5,983,278 A | 11/1999 | Chong | |
| 6,041,042 A | 3/2000 | Bussiere | |
| 6,085,238 A | 7/2000 | Yuasa | |
| 6,104,696 A | 8/2000 | Kadambi | |
| 6,185,214 B1 | 2/2001 | Schwartz | |
| 6,185,241 B1 | 2/2001 | Sun | |
| 6,438,106 B1 | 8/2002 | Pillar | |
| 6,542,266 B1 | 4/2003 | Phillips | |
| 6,633,761 B1 | 10/2003 | Singhal | |
| 6,771,610 B1 | 8/2004 | Seaman | |
| 6,873,602 B1 | 3/2005 | Ambe | |
| 6,956,824 B2 | 10/2005 | Mark | |
| 6,957,269 B2 | 10/2005 | Williams | |
| 6,975,581 B1 | 12/2005 | Medina | |
| 6,975,864 B2 | 12/2005 | Singhal | |
| 7,016,352 B1* | 3/2006 | Chow et al. | 370/392 |
| 7,097,308 B2 | 8/2006 | Singhal | |
| 7,173,934 B2 | 2/2007 | Lapuh | |
| 7,197,308 B2 | 3/2007 | Singhal | |
| 7,206,288 B2 | 4/2007 | Cometto | |
| 7,310,664 B1 | 12/2007 | Merchant | |
| 7,313,637 B2 | 12/2007 | Tanaka | |
| 7,315,545 B1 | 1/2008 | Chowdhury et al. | |
| 7,316,031 B2 | 1/2008 | Griffith | |
| 7,330,897 B2 | 2/2008 | Baldwin | |
| 7,380,025 B1 | 5/2008 | Riggins | |
| 7,430,164 B2 | 9/2008 | Bare | |
| 7,453,888 B2 | 11/2008 | Zabihi | |
| 7,477,894 B1 | 1/2009 | Sinha | |
| 7,480,258 B1 | 1/2009 | Shuen | |
| 7,508,757 B2 | 3/2009 | Ge | |
| 7,558,195 B1* | 7/2009 | Kuo et al. | 370/219 |
| 7,558,273 B1 | 7/2009 | Grosser, Jr. | |
| 7,571,447 B2 | 8/2009 | Ally | |
| 7,599,901 B2 | 10/2009 | Mital | |
| 7,688,736 B1 | 3/2010 | Walsh | |
| 7,688,960 B1 | 3/2010 | Aubuchon | |
| 7,690,040 B2 | 3/2010 | Frattura | |
| 7,706,255 B1 | 4/2010 | Kondrat et al. | |
| 7,716,370 B1 | 5/2010 | Devarapalli | |
| 7,729,296 B1 | 6/2010 | Choudhary | |
| 7,787,480 B1 | 8/2010 | Mehta | |
| 7,792,920 B2 | 9/2010 | Istvan | |
| 7,796,593 B1 | 9/2010 | Ghosh | |
| 7,808,992 B2 | 10/2010 | Homchaudhuri | |
| 7,836,332 B2 | 11/2010 | Hara | |
| 7,843,906 B1 | 11/2010 | Chidambaram et al. | |
| 7,843,907 B1 | 11/2010 | Abou-Emara | |
| 7,860,097 B1 | 12/2010 | Lovett | |
| 7,898,959 B1 | 3/2011 | Arad | |
| 7,924,837 B1 | 4/2011 | Shabtay | |
| 7,937,756 B2 | 5/2011 | Kay | |
| 7,949,638 B1 | 5/2011 | Goodson | |
| 7,957,386 B1 | 6/2011 | Aggarwal | |
| 8,018,938 B1 | 9/2011 | Fromm | |
| 8,027,354 B1 | 9/2011 | Portolani | |
| 8,054,832 B1 | 11/2011 | Shukla | |
| 8,068,442 B1 | 11/2011 | Kompella | |
| 8,078,704 B2 | 12/2011 | Lee | |
| 8,102,781 B2 | 1/2012 | Smith | |
| 8,102,791 B2 | 1/2012 | Tang | |
| 8,116,307 B1 | 2/2012 | Thesayi | |
| 8,125,928 B2 | 2/2012 | Mehta | |
| 8,134,922 B2 | 3/2012 | Elangovan | |
| 8,155,150 B1 | 4/2012 | Chung | |
| 8,160,063 B2 | 4/2012 | Maltz | |
| 8,160,080 B1 | 4/2012 | Arad | |
| 8,170,038 B2 | 5/2012 | Belanger | |
| 8,194,674 B1 | 6/2012 | Pagel | |
| 8,195,774 B2 | 6/2012 | Lambeth | |
| 8,204,061 B1 | 6/2012 | Sane | |
| 8,213,313 B1 | 7/2012 | Doiron | |
| 8,213,336 B2 | 7/2012 | Smith | |
| 8,230,069 B2 | 7/2012 | Korupolu | |
| 8,239,960 B2 | 8/2012 | Frattura | |
| 8,249,069 B2 | 8/2012 | Raman | |
| 8,270,401 B1 | 9/2012 | Barnes | |
| 8,295,291 B1 | 10/2012 | Ramanathan | |
| 8,295,921 B2 | 10/2012 | Wang | |
| 8,301,686 B1 | 10/2012 | Appajodu | |
| 8,339,994 B2 | 12/2012 | Gnanasekaran | |
| 8,351,352 B1 | 1/2013 | Eastlake, III | |
| 8,369,335 B2 | 2/2013 | Jha | |
| 8,369,347 B2 | 2/2013 | Xiong | |
| 8,392,496 B2 | 3/2013 | Linden | |
| 8,446,914 B2* | 5/2013 | Cheng et al. | 370/401 |
| 8,462,774 B2 | 6/2013 | Page | |
| 8,467,375 B2 | 6/2013 | Blair | |
| 8,520,595 B2 | 8/2013 | Yadav | |
| 8,599,850 B2 | 12/2013 | Jha | |
| 8,599,864 B2 | 12/2013 | Chung | |
| 8,615,008 B2 | 12/2013 | Natarajan | |
| 8,665,886 B2* | 3/2014 | Gupta et al. | 370/401 |
| 8,826,385 B2 | 9/2014 | Congdon | |
| 2001/0055274 A1 | 12/2001 | Hegge | |
| 2002/0019904 A1 | 2/2002 | Katz | |
| 2002/0021701 A1 | 2/2002 | Lavian | |
| 2002/0091795 A1 | 7/2002 | Yip | |
| 2003/0041085 A1 | 2/2003 | Sato | |
| 2003/0123393 A1 | 7/2003 | Feuerstraeter | |
| 2003/0174706 A1 | 9/2003 | Shankar | |
| 2003/0189905 A1 | 10/2003 | Lee | |
| 2004/0001433 A1 | 1/2004 | Gram | |
| 2004/0010600 A1 | 1/2004 | Baldwin | |
| 2004/0049699 A1 | 3/2004 | Griffith | |
| 2004/0117508 A1 | 6/2004 | Shimizu | |
| 2004/0120326 A1 | 6/2004 | Yoon | |
| 2004/0156313 A1 | 8/2004 | Hofmeister et al. | |
| 2004/0165595 A1 | 8/2004 | Holmgren | |
| 2004/0213232 A1 | 10/2004 | Regan | |
| 2005/0007951 A1 | 1/2005 | Lapuh | |
| 2005/0044199 A1 | 2/2005 | Shiga | |
| 2005/0094568 A1 | 5/2005 | Judd | |
| 2005/0094630 A1 | 5/2005 | Valdevit | |
| 2005/0122979 A1 | 6/2005 | Gross | |
| 2005/0157645 A1 | 7/2005 | Rabie et al. | |
| 2005/0157751 A1 | 7/2005 | Rabie | |
| 2005/0169188 A1 | 8/2005 | Cometto | |
| 2005/0195813 A1 | 9/2005 | Ambe | |
| 2005/0213561 A1 | 9/2005 | Yao | |
| 2005/0220096 A1 | 10/2005 | Friskney | |
| 2005/0265356 A1 | 12/2005 | Kawarai | |
| 2005/0278565 A1 | 12/2005 | Frattura | |
| 2006/0007869 A1 | 1/2006 | Hirota | |
| 2006/0018302 A1 | 1/2006 | Ivaldi | |
| 2006/0023707 A1 | 2/2006 | Makishima et al. | |
| 2006/0034292 A1 | 2/2006 | Wakayama | |
| 2006/0059163 A1 | 3/2006 | Frattura | |
| 2006/0062187 A1 | 3/2006 | Rune | |
| 2006/0072550 A1 | 4/2006 | Davis | |
| 2006/0083254 A1 | 4/2006 | Ge | |
| 2006/0098589 A1 | 5/2006 | Kreeger | |
| 2006/0168109 A1 | 7/2006 | Warmenhoven | |
| 2006/0184937 A1 | 8/2006 | Abels | |
| 2006/0221960 A1 | 10/2006 | Borgione | |
| 2006/0235995 A1 | 10/2006 | Bhatia | |
| 2006/0242311 A1 | 10/2006 | Mai | |
| 2006/0245439 A1 | 11/2006 | Sajassi | |
| 2006/0251067 A1 | 11/2006 | DeSanti | |
| 2006/0256767 A1 | 11/2006 | Suzuki | |
| 2006/0265515 A1 | 11/2006 | Shiga | |
| 2006/0285499 A1 | 12/2006 | Tzeng | |
| 2006/0291388 A1 | 12/2006 | Amdahl | |
| 2007/0036178 A1 | 2/2007 | Hares | |
| 2007/0086362 A1 | 4/2007 | Kato | |

(56) References Cited

U.S. PATENT DOCUMENTS

| | | |
|---|---|---|
| 2007/0094464 A1 | 4/2007 | Sharma |
| 2007/0097968 A1 | 5/2007 | Du |
| 2007/0116224 A1 | 5/2007 | Burke |
| 2007/0116422 A1 | 5/2007 | Reynolds |
| 2007/0177525 A1 | 8/2007 | Wijnands |
| 2007/0177597 A1 | 8/2007 | Ju |
| 2007/0183313 A1 | 8/2007 | Narayanan |
| 2007/0211712 A1 | 9/2007 | Fitch |
| 2007/0274234 A1 | 11/2007 | Kubota |
| 2007/0289017 A1 | 12/2007 | Copeland, III |
| 2008/0052487 A1 | 2/2008 | Akahane |
| 2008/0065760 A1 | 3/2008 | Damm |
| 2008/0080517 A1 | 4/2008 | Roy |
| 2008/0101386 A1* | 5/2008 | Gray .................. 370/401 |
| 2008/0112400 A1 | 5/2008 | Dunbar et al. |
| 2008/0133760 A1 | 6/2008 | Berkvens |
| 2008/0159277 A1* | 7/2008 | Vobbilisetty et al. ....... 370/357 |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285555 A1 | 11/2008 | Ogasahara |
| 2008/0298248 A1 | 12/2008 | Roeck |
| 2008/0310342 A1 | 12/2008 | Kruys |
| 2009/0037607 A1 | 2/2009 | Farinacci |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhara |
| 2009/0092043 A1 | 4/2009 | Lapuh |
| 2009/0106405 A1 | 4/2009 | Mazarick |
| 2009/0116381 A1 | 5/2009 | Kanda |
| 2009/0129384 A1 | 5/2009 | Regan |
| 2009/0138752 A1 | 5/2009 | Graham |
| 2009/0161584 A1 | 6/2009 | Guan |
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0245137 A1* | 10/2009 | Hares et al. .................. 370/254 |
| 2009/0245242 A1 | 10/2009 | Carlson |
| 2009/0252049 A1 | 10/2009 | Ludwig |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323708 A1 | 12/2009 | Ihle |
| 2009/0327392 A1 | 12/2009 | Tripathi |
| 2009/0327462 A1 | 12/2009 | Adams |
| 2010/0027420 A1 | 2/2010 | Smith |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0131636 A1 | 5/2010 | Suri |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston et al. |
| 2010/0169467 A1 | 7/2010 | Shukla |
| 2010/0169948 A1 | 7/2010 | Budko |
| 2010/0182920 A1 | 7/2010 | Matsuoka |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0257263 A1 | 10/2010 | Casado |
| 2010/0271960 A1 | 10/2010 | Krygowski |
| 2010/0281106 A1 | 11/2010 | Ashwood-Smith |
| 2010/0284418 A1 | 11/2010 | Gray |
| 2010/0287262 A1 | 11/2010 | Elzur |
| 2010/0287548 A1 | 11/2010 | Zhou |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0019678 A1 | 1/2011 | Mehta |
| 2011/0032945 A1 | 2/2011 | Mullooly |
| 2011/0035498 A1 | 2/2011 | Shah |
| 2011/0044339 A1* | 2/2011 | Kotalwar et al. ............... 370/392 |
| 2011/0044352 A1 | 2/2011 | Chaitou |
| 2011/0064086 A1 | 3/2011 | Xiong |
| 2011/0072208 A1 | 3/2011 | Gulati |
| 2011/0085560 A1 | 4/2011 | Chawla |
| 2011/0085563 A1 | 4/2011 | Kotha |
| 2011/0110266 A1 | 5/2011 | Li |
| 2011/0134802 A1 | 6/2011 | Rajagopalan |
| 2011/0134803 A1 | 6/2011 | Dalvi |
| 2011/0134925 A1 | 6/2011 | Safrai |
| 2011/0142053 A1 | 6/2011 | Van Der Merwe |
| 2011/0142062 A1 | 6/2011 | Wang |
| 2011/0161494 A1 | 6/2011 | McDysan |
| 2011/0161695 A1 | 6/2011 | Okita |
| 2011/0188373 A1 | 8/2011 | Saito |
| 2011/0194403 A1 | 8/2011 | Sajassi |
| 2011/0194563 A1 | 8/2011 | Shen |
| 2011/0228780 A1 | 9/2011 | Ashwood-Smith |
| 2011/0231574 A1 | 9/2011 | Saunderson |
| 2011/0235523 A1 | 9/2011 | Jha |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1 | 10/2011 | Mizrahi |
| 2011/0261828 A1 | 10/2011 | Smith |
| 2011/0268120 A1 | 11/2011 | Vobbilisetty |
| 2011/0273988 A1 | 11/2011 | Tourrilhes |
| 2011/0274114 A1 | 11/2011 | Dhar |
| 2011/0280572 A1 | 11/2011 | Vobbilisetty |
| 2011/0286457 A1 | 11/2011 | Ee |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dumbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Jacob Da Silva |
| 2012/0033669 A1 | 2/2012 | Mohandas |
| 2012/0099602 A1 | 4/2012 | Nagapudi |
| 2012/0106339 A1 | 5/2012 | Mishra |
| 2012/0131097 A1 | 5/2012 | Baykal |
| 2012/0131289 A1 | 5/2012 | Taguchi |
| 2012/0163164 A1 | 6/2012 | Terry |

(56) References Cited

U.S. PATENT DOCUMENTS

| | | |
|---|---|---|
| 2012/0177039 A1 | 7/2012 | Berman |
| 2012/0243539 A1 | 9/2012 | Keesara |
| 2012/0275347 A1 | 11/2012 | Banerjee |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1 | 12/2012 | Kamath et al. |
| 2012/0327766 A1 | 12/2012 | Tsai et al. |
| 2012/0327937 A1 | 12/2012 | Melman et al. |
| 2013/0003737 A1 | 1/2013 | Sinicrope |
| 2013/0028072 A1 | 1/2013 | Addanki |
| 2013/0034015 A1 | 2/2013 | Jaiswal |
| 2013/0067466 A1 | 3/2013 | Combs |
| 2013/0070762 A1 | 3/2013 | Adams |
| 2013/0114595 A1 | 5/2013 | Mack-Crane et al. |
| 2013/0127848 A1 | 5/2013 | Joshi |
| 2013/0194914 A1 | 8/2013 | Agarwal |
| 2013/0250951 A1 | 9/2013 | Koganti |
| 2013/0259037 A1 | 10/2013 | Natarajan |
| 2013/0272135 A1 | 10/2013 | Leong |
| 2014/0105034 A1 | 4/2014 | Sun |

FOREIGN PATENT DOCUMENTS

| | | |
|---|---|---|
| EP | 1398920 A2 | 3/2004 |
| EP | 1916807 A2 | 4/2008 |
| EP | 2001167 A1 | 12/2008 |
| WO | 2009042919 | 4/2009 |
| WO | 2010111142 A1 | 9/2010 |
| WO | 2014031781 | 2/2014 |

OTHER PUBLICATIONS

Perlman, Radia et al., "RBridge VLAN Mapping", Dec. 4, 2003.
Perlman, Radia et al., "Challenges and Opportunities in the Design of TRILL: a Routed layer 2 Technology", 2009.
Perlman, Radia et al., "RBridges: Base Protocol Specification" <draft-ietf-trill-rbridge-protocol-16.txt>, 2010.
S. Nada, Ed et al., "Virtual Router Redundancy Protocol (VRRP) Version 3 for IPv4 and IPv6", Mar. 2010.
Lapuh, Roger et al., "Split Multi-link Trunking (SMLT)", Oct. 2002.
Knight, S. et al., "Virtual Router Redundancy Protocol", Apr. 1998.
Eastlake 3rd., Donald et al., "RBridges: TRILL Header Options", <draft-ietf-trill-rbridge-options-00.txt>, Dec. 2009.
Lapuh, Roger et al., "Split Multi-link Trunking (SMLT)", draft-lapuh-network-smlt-08, Jul. 2008.
Brocade Fabric OS (FOS) 6.2 Virtual Fabrics Feature Frequently Asked Questions, 2009.
Touch, J. et al., "Transparent Interconnection of Lots of Links (TRILL): Problem and Applicability Statement", May 2009.
Christensen, M. et al., "Considerations for Internet Group Management Protocol (IGMP) and Multicast Listener Discovery (MLD) Snooping Switches", May 2006.
Office Action for U.S. Appl. No. 13/533,843, filed Jun. 26, 2012, dated Oct. 21, 2013.
Office Action for U.S. Appl. No. 13/044,326, filed Mar. 9, 2011, dated Oct. 2, 2013.
Office Action for U.S. Appl. No. 13/312,903, filed Dec. 6, 2011, dated Nov. 12, 2013.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Office Action for U.S. Appl. No. 13/598,204, filed Aug. 29, 2012, from Pascual Peguero, Natali, dated Feb. 20, 2014.
U.S. Appl. No. 12/312,903 Office Action dated Jun. 13, 2013.
U.S. Appl. No. 13/365,808 Office Action dated Jul. 18, 2013.
U.S. Appl. No. 13/365,993 Office Action dated Jul. 23, 2013.
U.S. Appl. No. 13/092,873 Office Action dated Jun. 19, 2013.
U.S. Appl. No. 13/184,526 Office Action dated May 22, 2013.
U.S. Appl. No. 13/184,526 Office Action dated Jan. 28, 2013.
U.S. Appl. No. 13/050,102 Office Action dated May 16, 2013.
U.S. Appl. No. 13/050,102 Office Action dated Oct. 26, 2012.
U.S. Appl. No. 13/044,301 Office Action dated Feb. 22, 2013.
U.S. Appl. No. 13/044,301 Office Action dated Jun. 11, 2013.
U.S. Appl. No. 13/030,688 Office Action dated Apr. 25, 2013.
U.S. Appl. No. 13/030,806 Office Action dated Dec. 13, 2012.
U.S. Appl. No. 13/030,806 Office Action dated Jun. 11, 2013.
U.S. Appl. No. 13/098,360 Office Action dated May 31, 2013.
U.S. Appl. No. 13/092,864 Office Action dated Sep. 19, 2012.
U.S. Appl. No. 12/950,968 Office Action dated Jun. 7, 2012.
U.S. Appl. No. 12/950,968 Office Action dated Jan. 4, 2013.
U.S. Appl. No. 13/092,877 Office Action dated Mar. 4, 2013.
U.S. Appl. No. 12/950,974 Office Action dated Dec. 20, 2012.
U.S. Appl. No. 12/950,974 Office Action dated May 24, 2012.
U.S. Appl. No. 13/092,752 Office Action dated Feb. 5, 2013.
U.S. Appl. No. 13/092,752 Office Action dated Jul. 18, 2013.
U.S. Appl. No. 13/092,701 Office Action dated Jan. 28, 2013.
U.S. Appl. No. 13/092,701 Office Action dated Jul. 3, 2013.
U.S. Appl. No. 13/092,460 Office Action dated Jun. 21, 2013.
U.S. Appl. No. 13/042,259 Office Action dated Mar. 18, 2013.
U.S. Appl. No. 13/042,259 Office Action dated Jul. 31, 2013.
U.S. Appl. No. 13/092,580 Office Action dated Jun. 10, 2013.
U.S. Appl. No. 13/092,724 Office Action dated Jul. 16, 2013.
U.S. Appl. No. 13/092,724 Office Action dated Feb. 5, 2013.
U.S. Appl. No. 13/098,490 Office Action dated Dec. 21, 2012.
U.S. Appl. No. 13/098,490 Office Action dated Jul. 9, 2013.
U.S. Appl. No. 13/087,239 Office Action dated May 22, 2013.
U.S. Appl. No. 13/087,239 Office Action dated Dec. 5, 2012.
U.S. Appl. No. 12/725,249 Office Action dated Apr. 26, 2013.
U.S. Appl. No. 12/725,249 Office Action dated Sep. 12, 2012.
Office Action for U.S. Appl. No. 13/092,887, dated Jan. 6, 2014.
Brocade Unveils "The Effortless Network", http://newsroom.brocade.com/press-releases/brocade-unveils-the-effortless-network--nasdaq-brcd-0859535, 2012.
Foundry FastIron Configuration Guide, Software Release FSX 04.2.00b, Software Release FWS 04.3.00, Software Release FGS 05.0.00a, Sep. 26, 2008.
FastIron and TurboIron 24X Configuration Guide Supporting FSX 05.1.00 for FESX, FWSX, and FSX; FGS 04.3.03 for FGS, FLS and FWS; FGS 05.0.02 for FGS-STK and FLS-STK, FCX 06.0.00 for FCX; and TIX 04.1.00 for TI24X, Feb. 16, 2010.
FastIron Configuration Guide Supporting Ironware Software Release 07.0.00, Dec. 18, 2009.
"The Effortless Network: HyperEdge Technology for the Campus LAN", 2012.
Narten, T. et al. "Problem Statement: Overlays for Network Virtualization", draft-narten-nvo3-overlay-problem-statement-01, Oct. 31, 2011.
Knight, Paul et al., "Layer 2 and 3 Virtual Private Networks: Taxonomy, Technology, and Standardization Efforts", IEEE Communications Magazine, Jun. 2004.
"An Introduction to Brocade VCS Fabric Technology", Brocade white paper, http://community.brocade.com/docs/ Doc-2954, Dec. 3, 2012.
Kreeger, L. et al., "Network Virtualization Overlay Control Protocol Requirements", Draft-kreeger-nvo3-overlay-cp-00, Jan. 30, 2012.
Knight, Paul et al., "Network based IP VPN Architecture using Virtual Routers", May 2003.
Louati, Wajdi et al., "Network-based virtual personal overlay networks using programmable virtual routers", IEEE Communications Magazine, Jul. 2005.
U.S. Appl. No. 13/092,877 Office Action dated Sep. 5, 2013.
U.S. Appl. No. 13/044,326 Office Action dated Oct. 2, 2013.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.

(56) References Cited

OTHER PUBLICATIONS

Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.
Rosen, E. et al., "BGP/MPLS VPNs", Mar. 1999.
Office Action for U.S. Appl. No. 14/577,785, filed Dec. 19, 2014, dated Apr. 13, 2015.
Office Action for U.S. Appl. No. 13/786,328, filed Mar. 5, 2013, dated Mar. 13, 2015.
Office Action for U.S. Appl. No. 13/425,238, filed Mar. 20, 2012, dated Mar. 12, 2015.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Perlman, Radia et al., 'RBridge VLAN Mapping', TRILL Working Group, Dec. 4, 2009, pp. 1-12.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Aug. 29, 2014, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Aug. 21, 2014, U.S. Appl. No. 13/184,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Brocade 'An Introduction to Brocade VCS Fabric Technology', Dec. 3, 2012.
Lapuh, Roger et al., 'Split Multi-link Trunking (SMLT) draft-lapuh-network-smlt-08', Jan. 2009.
Office Action for U.S. Appl. No. 13/351,513, filed Jan. 17, 2012, dated Feb. 28, 2014.
Perlman, Radia et al., 'RBridges: Base Protocol Specification; Draft-ietf-trill-rbridge-protocol-16.txt', Mar. 3, 2010, pp. 1-117.
Office Action for U.S. Appl. No. 13/365,993, filed Feb. 3, 2012, from Cho, Hong Sol., dated Jul. 23, 2013.
Office Action for U.S. Appl. No. 13/030,806, filed Feb. 18, 2011, date Dec. 3, 2012.
Office Action for U.S. Appl. No. 13/098,490, filed May 2, 2011, dated Mar. 27, 2014.
Office Action for U.S. Appl. No. 13/312,903, filed Dec. 6, 2011, dated Jun. 13, 2013.
Office Action for U.S. Appl. No. 13/092,873, filed Apr. 22, 2011, dated Nov. 29, 2013.
Office Action for U.S. Appl. No. 13/184,526, filed Jul. 16, 2011, dated Dec. 2, 2013.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.

(56) References Cited

OTHER PUBLICATIONS

Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Perlman R: 'Challenges and opportunities in the design of TRILL: a routed layer 2 technology', 2009 IEEE Globecom Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].
TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action forU.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.

\* cited by examiner

METHOD AND SYSTEM FOR LINK AGGREGATION ACROSS MULTIPLE SWITCHES

RELATED APPLICATIONS

This application is a continuation of U.S. application Ser. No. 13/092,864, entitled "METHOD AND SYSTEM FOR LINK AGGREGATION ACROSS MULTIPLE SWITCHES," by inventors Joseph Juh-En Cheng, Wing Cheung, John Michael Terry, Suresh Vobbilisetty, Surya P. Varanasi, and Parviz Ghalambor, filed 22 Apr. 2011, which claims the benefit of U.S. Provisional Application No. 61/352,720, entitled "Method and Apparatus For Link Aggregation Across Multiple Switches," by inventors Joseph Juh-En Cheng, Wing Cheung, John Michael Terry, Suresh Vobbilisetty, Surya P. Varanasi, and Parviz Ghalambor, filed 8 Jun. 2010, the disclosure of which is incorporated by reference herein.

The present disclosure is related to U.S. patent application Ser. No. 12/725,249, entitled "REDUNDANT HOST CONNECTION IN A ROUTED NETWORK," by inventors Somesh Gupta, Anoop Ghanwani, Phanidhar Koganti, and Shunjia Yu, filed 16 Mar. 2010; and U.S. patent application Ser. No. 13/087,239, entitled "VIRTUAL CLUSTER SWITCHING," by inventors Suresh Vobbilisetty and Dilip Chatwani, filed 14 Apr. 2011;

the disclosures of which are incorporated by reference herein.

BACKGROUND

1. Field

The present disclosure relates to network management. More specifically, the present disclosure relates to a method and system for link aggregation across multiple switches.

2. Related Art

As more mission-critical applications are being implemented in data communication networks, high-availability operation is becoming progressively more important as a value proposition for network architects. It is often desirable to divide a conventional aggregated link (from one device to another) among multiple network devices, such that a node failure or link failure would not affect the operation of the multi-homed device.

Meanwhile, layer-2 (e.g., Ethernet) networking technologies continue to evolve. More routing-like functionalities, which have traditionally been the characteristics of layer-3 (e.g., IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

While TRILL brings many desirable features to layer-2 networks, some issues remain unsolved when TRILL-capable devices are coupled with non-TRILL devices. Particularly, when a non-TRILL device is coupled to multiple TRILL devices using link aggregation, existing technologies do not provide a scalable and flexible solution that takes full advantage of the TRILL network.

SUMMARY

One embodiment of the present invention provides a switch. The switch includes a forwarding mechanism and a control mechanism. During operation, the forwarding mechanism forwards frames based on their Ethernet headers. The control mechanism operates the switch in conjunction with a separate physical switch as a single logical switch and assigns a virtual switch identifier to the logical switch, wherein the virtual switch identifier is associated with a link aggregation group.

In a variation on this embodiment, the switch is a layer-2 switch capable of routing without requiring the network topology to be based on a spanning tree.

In a variation on this embodiment, the switch is a routing bridge configured to operate in accordance with the TRILL protocol.

In a variation on this embodiment, the control mechanism derives the virtual switch identifier based on an identifier for the link aggregation group.

In a variation on this embodiment, the switch includes a frame-marking mechanism configured to mark an ingress-switch field of a frame with the virtual switch identifier, wherein the frame is received from a device coupled to the switch.

In a variation on this embodiment, the virtual switch identifier is a virtual RBridge identifier in compliance with the TRILL protocol.

In a variation on this embodiment, the link aggregation group is identified by a LAG ID in accordance to the IEEE 802.1ax standard.

DETAILED DESCRIPTION

Figure 1:
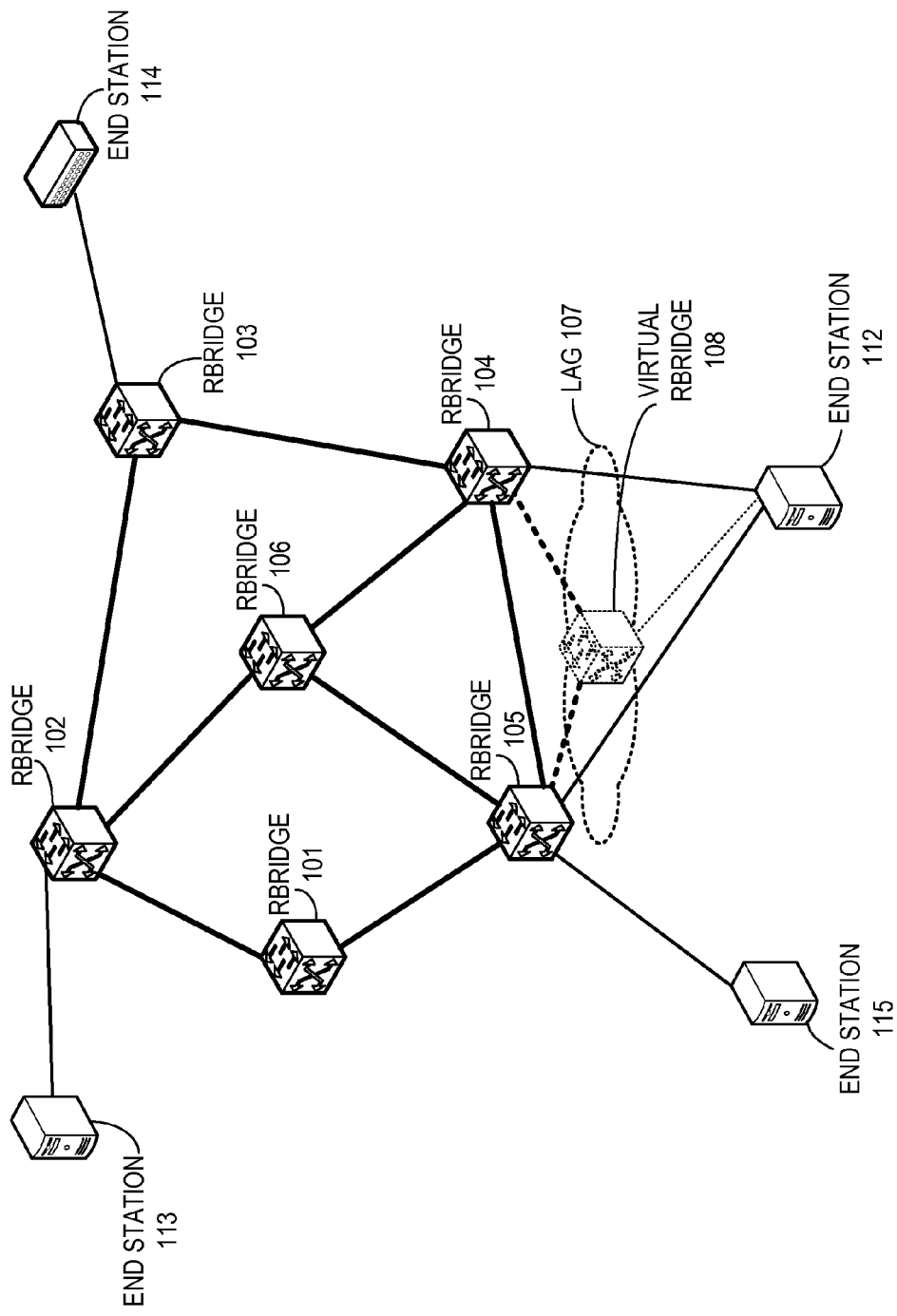
FIG. 1 illustrates an exemplary network where a virtual RBridge identifier is assigned to two physical TRILL RBridges which are coupled to a non-TRILL device via a divided aggregate link, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of providing a scalable and flexible way of provisioning multi-switch link aggregation in a TRILL network is solved by forming a logical, virtual RBridge corresponding to a link aggregation group across multiple RBridges and assigning a virtual RBridge identifier based on the link aggregation group (LAG) identifier. For example, in a TRILL network, when an end station is coupled to two separate RBridges and the links to these RBridges form a LAG, a virtual TRILL RBridge identifier (ID) is generated based on the LAG ID, and the end station is considered to be logically coupled to the virtual RBridge. An incoming frame from the end-station is marked with a virtual RBridge nickname as its ingress RBridge nickname and routed through the rest of the TRILL network. To the rest of the TRILL network, such a dual-homed end station appears to be coupled to the virtual RBridge. When one of the aggregated links fails, the affected end station is no longer considered coupled to the virtual RBridge. Instead, the end station would be considered to be coupled to the physical RBridge with an operational link. This configuration allows fast protection switching and timely topology convergence.

Although the present disclosure is presented using examples based on the TRILL protocol, embodiments of the present invention are not limited to TRILL networks, or networks defined in a particular Open System Interconnection Reference Model (OSI reference model) layer.

The term "RBridge" refers to routing bridges, which are bridges implementing the TRILL protocol as described in IETF draft "RBridges: Base Protocol Specification," available at http://tools.ietf.org/html/draft-ietf-trill-rbridge-protocol-16, which is incorporated by reference herein. Embodiments of the present invention are not limited to the application among RBridges. Other types of switches, routers, and forwarders can also be used.

The term "end station" refers to a network device that is not TRILL-capable. "End station" is a relative term with respect to the TRILL network. However, "end station" does not necessarily mean that the network device is an end host. An end station can be a host, a conventional layer-2 switch, an IP router, or any other type of network device. Additionally, an end station can be coupled to other switches, routers, or hosts further away from the TRILL network. In other words, an end station can be an aggregation point for a number of network devices to enter the TRILL network.

The term "dual-homed end station" refers to an end station that has an aggregate link to two or more TRILL RBridges, where the aggregate link includes multiple physical links to the different RBridges. The aggregate link, which includes multiple physical links, functions as one logical link to the end station. Although the term "dual" is used here, the term "dual-homed end station" does not limit the number of physical RBridges sharing the aggregate link to two. In various embodiments, other numbers of physical RBridges can share the same aggregate link. Where "dual-homed end station" is used in the present disclosure, the term "multi-homed end station" can also be used.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "RBridge identifier" refers to a group of bits that can be used to identify an RBridge. Note that the TRILL standard uses "RBridge ID" to denote a 48-bit intermediate-system-to-intermediate-system (IS-IS) System ID assigned to an RBridge, and "RBridge nickname" to denote a 16-bit value that serves as an abbreviations for the "RBridge ID." In this disclosure, "RBridge identifier" is used as a generic term and is not limited to any bit format, and can refer to "RBridge ID" or "RBridge nickname" or any other format that can identify an RBridge.

Network Architecture

FIG. 1 illustrates an exemplary network where a virtual TRILL identifier is assigned to two physical TRILL RBridges which are coupled to a non-TRILL device via a divided aggregate link, in accordance with an embodiment of the present invention. As illustrated in FIG. 1, a TRILL network includes six RBridges, 101, 102, 103, 104, 105, and 106. End station 113 is coupled to RBridge 102; end station 114 is coupled to RBridge 103; and end station 115 is coupled to RBridge 105. End station 112 is dual-homed and coupled to RBridges 104 and 105. The goal is to allow a dual-homed end station to use both physical links to two separate TRILL RBridges as a single, logical aggregate link. Such a configuration would achieve true redundancy and facilitate fast protection switching.

However, in a conventional TRILL network, the dual-home-style connectivity would not provide the desired result, because the TRILL protocol depends on MAC address learning to determine the location of end stations (i.e., to which ingress RBridge an end station is coupled) based on a frame's ingress TRILL RBridge ID. As such, an end station can only appear to be reachable via a single physical RBridge. For example, assume that end station 112 is in communication with end station 113. The ingress RBridge would be RBridges 105 and 104, and the egress RBridge would be RBridge 102. The incoming frames from end station 112 would have either RBridge 104 or RBridge 105 marked as their ingress RBridge ID. When RBridge 102 receives these frames and performs MAC address learning, RBridge 102 would assume that end station 112 is moving and is either coupled to RBridge 104 or RBridge 105 (but not both). RBridge 102 would send the frames from end station 113 to either RBridge 104 or RBridge 105. Consequently, only one of the physical links leading to end station 112 is used, which defeats the purpose of having redundant links between end station 112 and RBridges 104 and 105.

In embodiments of the present invention, as illustrated in FIG. 1, RBridges 104 and 105 are configured to operate in a special "trunked" mode for end station 112. End stations 112 view RBridges 104 and 105 as part of one single logical switch. Dual-homed end station 112 is considered to be logically coupled to virtual RBridge 108 via logical links represented by the dotted line. Virtual RBridge 108 is considered to be logically coupled to both RBridges 104 and 105, optionally with zero-cost links (also represented by dotted lines).

From end station 112's point of view, it forms a link aggregation group (LAG) with the single logical switch represented by RBridges 105 and 104. During link bring-up, the link layer discovery protocol (LLDP) instances on both end station 112 and RBridges 105 and 104 negotiate the LAG ID for LAG 107, which includes the two physical links between end station 112 and RBridges 105 and 104. The corresponding ports on RBridges 105 and 104 are mapped to the same LAG ID. More details about the LAG ID negotiation process can be found in the IEEE 802.1AX standard, available at http://standards.ieee.org/getieee802/download/802.1AX-2008.pdf, which is incorporated by reference herein.

In one embodiment, virtual RBridge 108's identifier can be derived from the LAG ID. That is, once the LAG negotiation is complete, the virtual RBridge ID can be determined. This configuration allows a one-to-one mapping relationship between the virtual RBridge ID and the LAG ID.

Incoming frames from end station 112 are marked with virtual RBridge 108's nickname as their ingress RBridge nickname. As a result, other RBridges in the TRILL network can learn that end station 112 is reachable via virtual RBridge 108. Furthermore, RBridges 104 and 105 can advertise their respective connectivity (optionally via zero-cost links) to virtual RBridge 108. Hence, multi-pathing can be achieved when other RBridges choose to send frames to virtual RBridge 108 (which is marked as the egress RBridge in the frames) via RBridges 104 and 105. In the following description, RBridges which participate in link aggregation and form a virtual RBridge are referred to as "partner RBridges."

Since the two partner RBridges function as a single logical RBridge, the MAC address reachability learned by each RBridge is shared with the other partner RBridge. For example, during normal operation, end station 112 may choose to send its outgoing frames only via the link to RBridge 105. As a result, only RBridge 105 would learn end station 112's MAC address (and the corresponding port on RBridge 105 to which end station 112 is coupled). This information is then shared by RBridge 105 with RBridge 104. Since the frames coming from end station 112 would have virtual RBridge 108's nickname as their ingress RBridge nickname, when other devices in the network send frames back to end station 112, these frames would have virtual RBridge 108's nickname as their egress RBridge nickname, and these frames might be sent to either RBridge 104 or 105. When RBridge 104 receives such a frame, it can determine that this frame should be sent to its partner RBridge 105, based on the MAC reachability information shared by RBridge 105.

An end station is not required to change the way it is configured for link aggregation. A dual-homed end station only needs to be configured to have a LAG to the RBridges, as would be the case with a conventional, physical RBridge, using an existing link aggregation method. Hence, the dual-homed end station does not need to be aware that the virtual RBridge on the other end of the aggregate link is actually two physical RBridges. Furthermore, the rest of the TRILL network (apart from RBridges 104 and 105) is also not required to be aware that virtual RBridge 108 is actually not a physical RBridge. That is, to the rest of the TRILL network, virtual RBridge 108 is indistinguishable from any of the physical RBridges. Therefore, the present invention does not require extra configuration to the rest of the TRILL network.

Frame Processing

Figure 2:
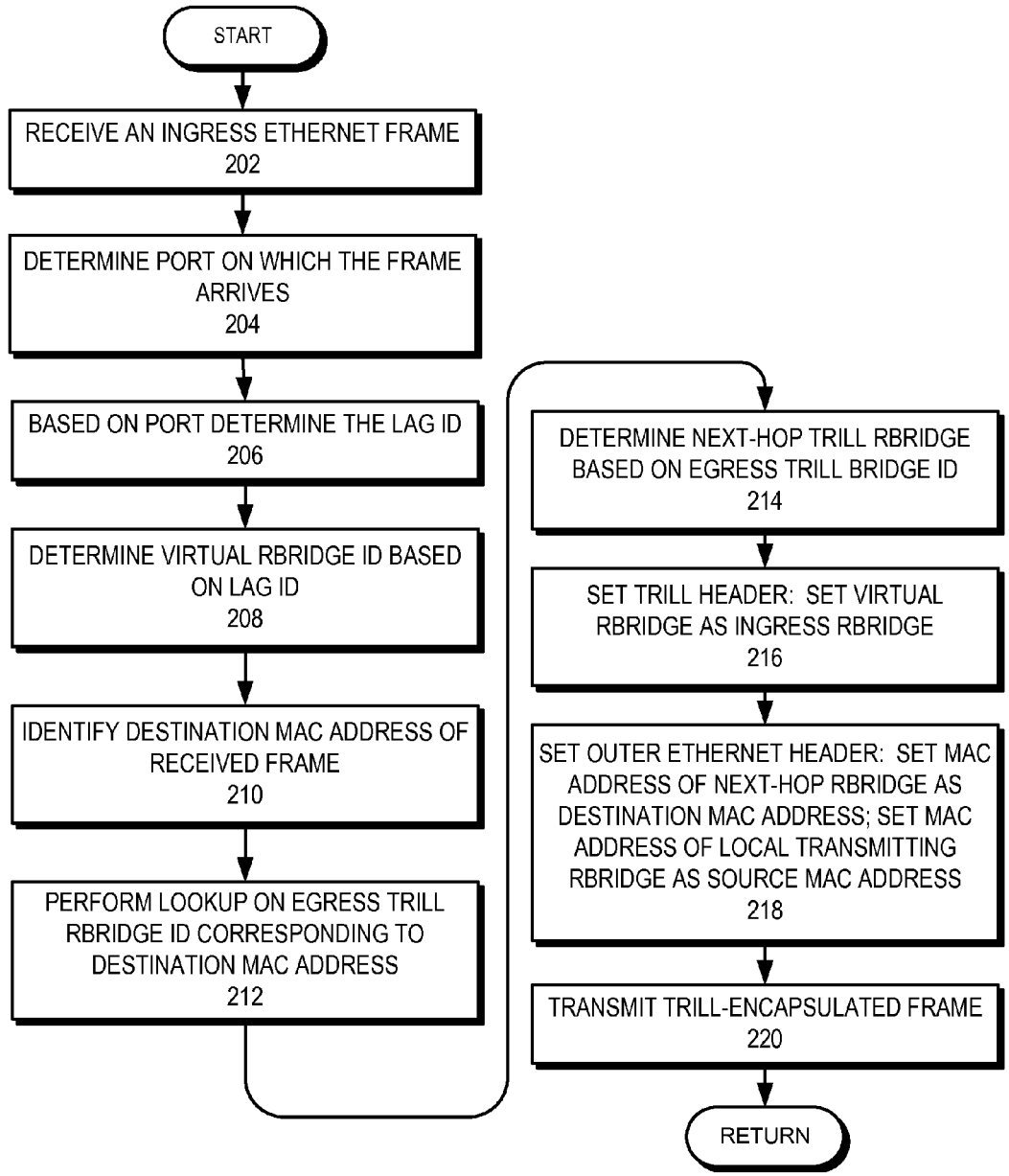
FIG. 2 presents a flowchart illustrating the process of configuring the TRILL header of an ingress frame from a dual-homed end station at an ingress physical RBridge, in accordance with an embodiment of the present invention.

FIG. 2 presents a flowchart illustrating the process of configuring the TRILL header of an ingress frame from a dual-homed end station at an ingress physical RBridge, in accordance with an embodiment of the present invention. During operation, an RBridge participating in link aggregation receives an ingress Ethernet frame from an end station (operation 202). The RBridge then determines the port on which the frame arrives (operation 204). Based on the determine port, the RBridge further determines the LAG ID associated with the port (operation 206). Note that the port-to-LAG ID association is established during the link discovery process.

Subsequently, the RBridge determines the virtual RBridge ID based on the LAG ID (operation 208). (Note that the virtual RBridge ID can be directly derived from the LAG ID.) The RBridge then identifies the destination MAC address of the received frame (operation 210). Based on the destination MAC address, the RBridge performs a lookup on the egress TRILL RBridge nickname (operation 212). Next, the RBridge determines the next-hop TRILL RBridge based on the egress TRILL RBridge nickname (operation 214). (It is assumed that the routing function in the TRILL protocol or other routing protocol is responsible for populating the forwarding information base at each RBridge.)

Subsequently, the RBridge sets the TRILL header of the frame (operation 216). In doing so, the RBridge sets the virtual RBridge as the ingress RBridge for the frame. The egress RBridge of the TRILL header is set based on the result of operation 212.

The RBridge then sets the outer Ethernet header of the frame (operation 218). In doing so, the RBridge sets the MAC address of the next-hop RBridge (the result of operation 214) as the destination MAC address in the outer Ethernet header. The RBridge further sets the MAC address of the local transmitting RBridge as the source MAC address in the outer Ethernet header. After setting the outer Ethernet header, the RBridge transmits the TRILL-encapsulated frame to the next-hop RBridge (operation 220).

Figure 3:
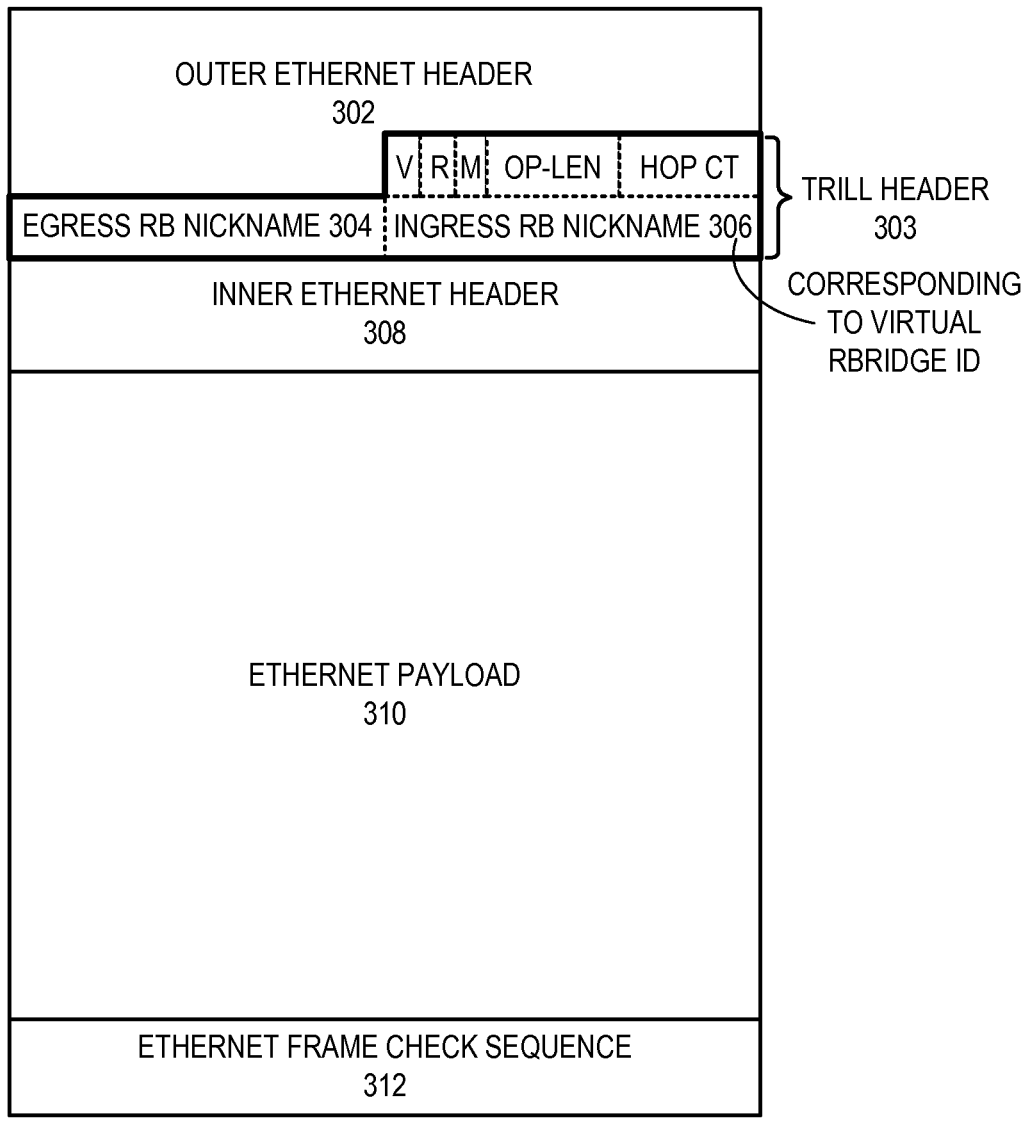
FIG. 3 illustrates an exemplary header configuration of an ingress TRILL frame which contains a virtual RBridge nickname in its ingress RBridge nickname field, in accordance with an embodiment of the present invention.

FIG. 3A illustrates an exemplary header configuration of an ingress TRILL frame which contains a virtual RBridge nickname in its ingress RBridge nickname field, in accordance with an embodiment of the present invention. In this example, a TRILL-encapsulated frame includes an outer Ethernet header 302, a TRILL header 303, an inner Ethernet header 308, an Ethernet payload 310, and an Ethernet frame check sequence (FCS) 312.

TRILL header 303 includes a version field (denoted as "V"), a reserved field (denoted as "R"), a multi-destination indication field (denoted as "M"), an option-field-length indication field (denoted as "OP-LEN"), and a hop-count field (denoted as "HOP CT"). Also included are an egress RBridge nickname field 304 and an ingress RBridge nickname field 306.

In some embodiments, in addition to carrying the virtual RBridge's nickname in the ingress RBridge nickname field, it is possible to include the physical ingress RBridge nickname in the TRILL option field. This configuration can facilitate end-to-end congestion notification and help with multicast pruning scenarios.

Furthermore, it is also possible to carry virtual RBridge identifier in the TRILL option field, instead of the source RBridge nickname field. The ingress RBridge nickname field of an incoming frame is used to carry the nickname of the physical ingress RBridge (which is one of the partner RBridges forming the virtual RBridge). This configuration allows other RBridges in the TRILL network to identify the actual, physical ingress RBridge as well as the virtual ingress RBridge.

Figure 4:
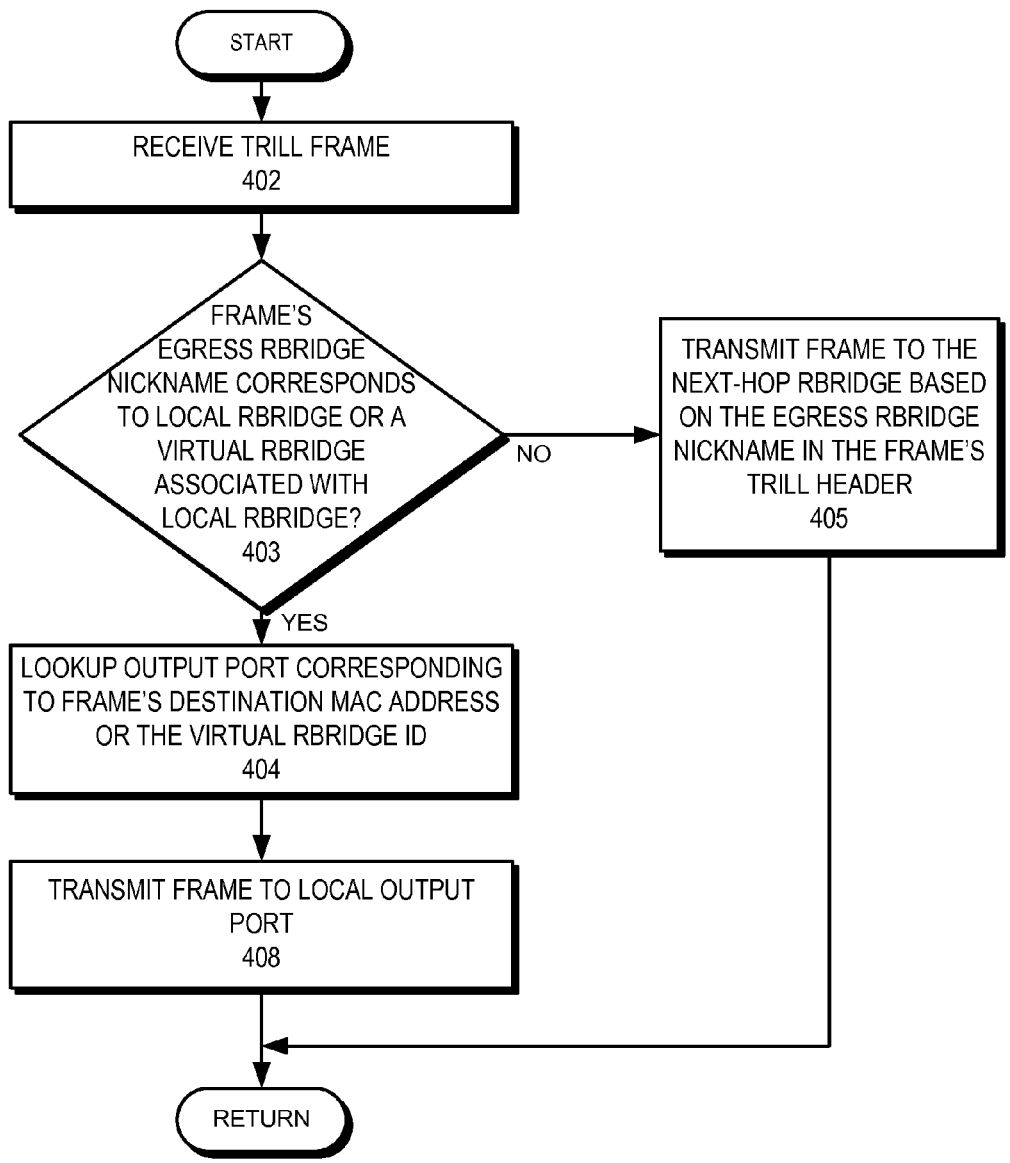
FIG. 4 presents a flowchart illustrating the process of forwarding a unicast TRILL frame at a partner RBridge which participates in link aggregation, in accordance with an embodiment of the present invention.

After a partner RBridge encapsulates an ingress frame with the proper TRILL and outer Ethernet headers and transmits the frame to its destination, it is expected to receive frames in the reverse direction from the destination in response to the transmission. FIG. 4 presents a flowchart illustrating the process of receiving and forwarding a unicast TRILL frame at a partner RBridge which participates in link aggregation, in accordance with an embodiment of the present invention.

During operation, a partner RBridge receives a TRILL frame (operation 402). The RBridge then determines whether the frame's egress RBridge nickname corresponds to the local RBridge or a virtual RBridge associated with the local RBridge (operation 403). If the frame's egress RBridge nickname matches neither the local RBridge nor a virtual RBridge associated with the local RBridge (i.e., the frame is not destined to the local RBridge), the RBridge transmits the frame to the next-hop RBridge based on the frame's egress RBridge nickname (operation 405).

On the other hand, if the condition in operation 403 is met, the RBridge then performs a lookup in its MAC-address table to identify an output port corresponding to the frame's destination MAC address in its inner Ethernet header if the egress RBridge nickname matches the local physical RBridge ID (operation 404). If the frame's egress RBridge nickname corresponds to the virtual RBridge, then the RBridge can determine the LAG ID corresponding to the virtual RBridge, and determine the output port associated with that LAG ID.

Note that the MAC reachability information is shared between the two partner RBridges forming the virtual RBridge. Hence, even if the RBridge has not received an ingress frame with the same source MAC address (i.e., the RBridge has not learned the MAC address locally), the RBridge can still determine that the destination MAC address is reachable via a local link based on the MAC reachability information shared from the partner RBridge. Subsequently, the RBridge transmits the frame to the local output port corresponding to the frame's destination MAC address in its inner Ethernet header (operation 408).

Failure Handling

Figure 5:
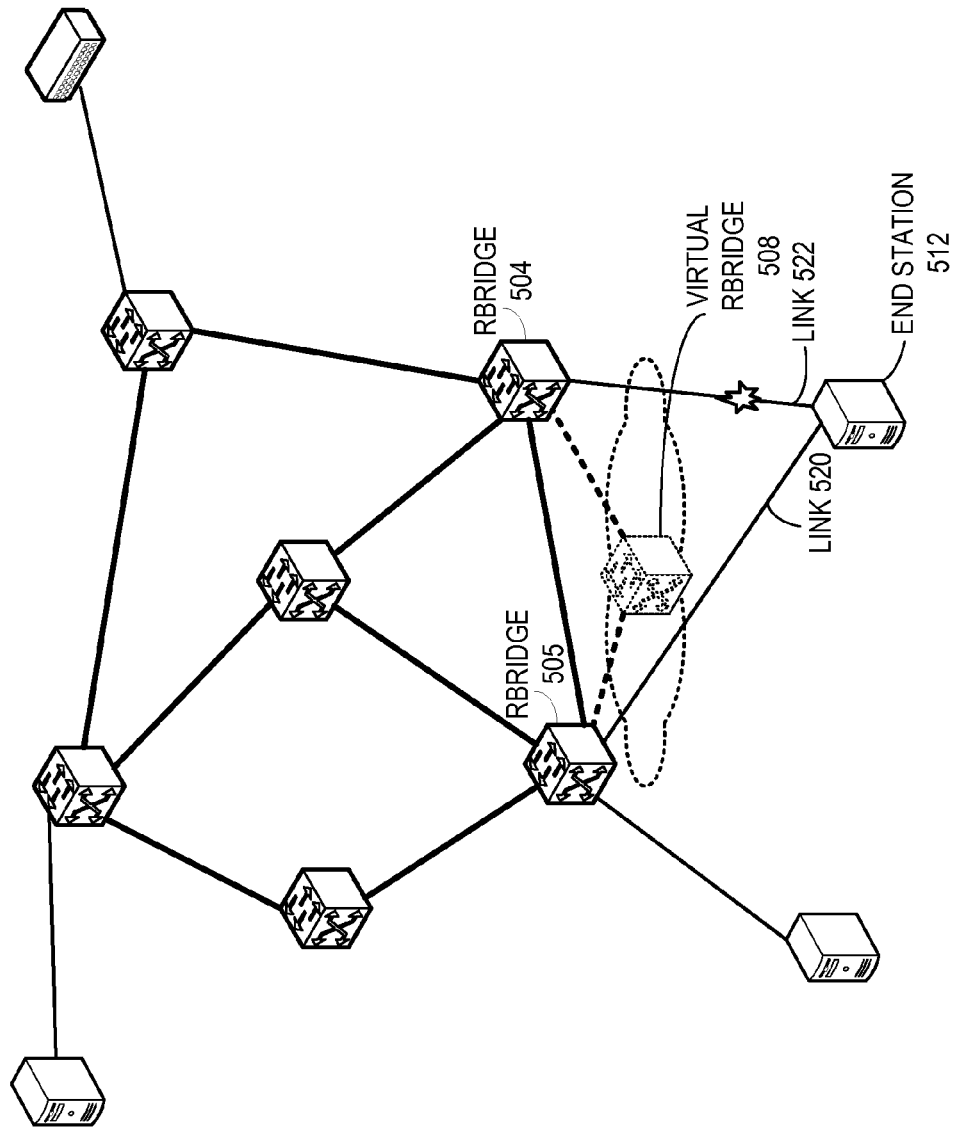
FIG. 5 illustrates a scenario where one of the physical links of a dual-homed end station experiences a failure, in accordance with an embodiment of the present invention.

FIG. 5 illustrates a scenario in which one of the physical links of a dual-homed end station experiences a failure, in accordance with an embodiment of the present invention. In this example, assume that an end station 512 is dual-homed with RBridges 505 and 504 via aggregate links. In particular, end station 512 is coupled to RBridge 505 via link 520, and coupled to RBridge 504 via link 522. Links 520 and 522 form a LAG that corresponds to a virtual RBridge 508. RBridge 508's identifier is derived from the LAG ID. Suppose that link 522 fails during operation. RBridge 504 can detect this failure and notify RBridge 505.

As a result, RBridge 505 discontinues marking frames coming from end station 512 with the nickname of virtual RBridge 508. Instead, the source RBridge nickname for the frames from end station 512 are marked with RBridge 505's nickname. In other words, since end station 512 no longer has the aggregate link to both RBridges 505 and 504, virtual RBridge 508 no longer exists for end station 512. After the TRILL-encapsulated frames from end station 512 reach other egress RBridges in the network, these RBridges will learn that the MAC address corresponding to end station 512 is associated with RBridge 505, instead of virtual RBridge 508. Consequently, future frames destined to end station 512 will be sent to RBridge 505. Note that, during the topology convergence process, RBridge 504 may continue to receive frames destined to end station 512. RBridge 504 can flood these frames to all the ports (except the ports from which the frames are received), or optionally forward these frames to RBridge 505 so there is minimal data loss.

Figure 6:
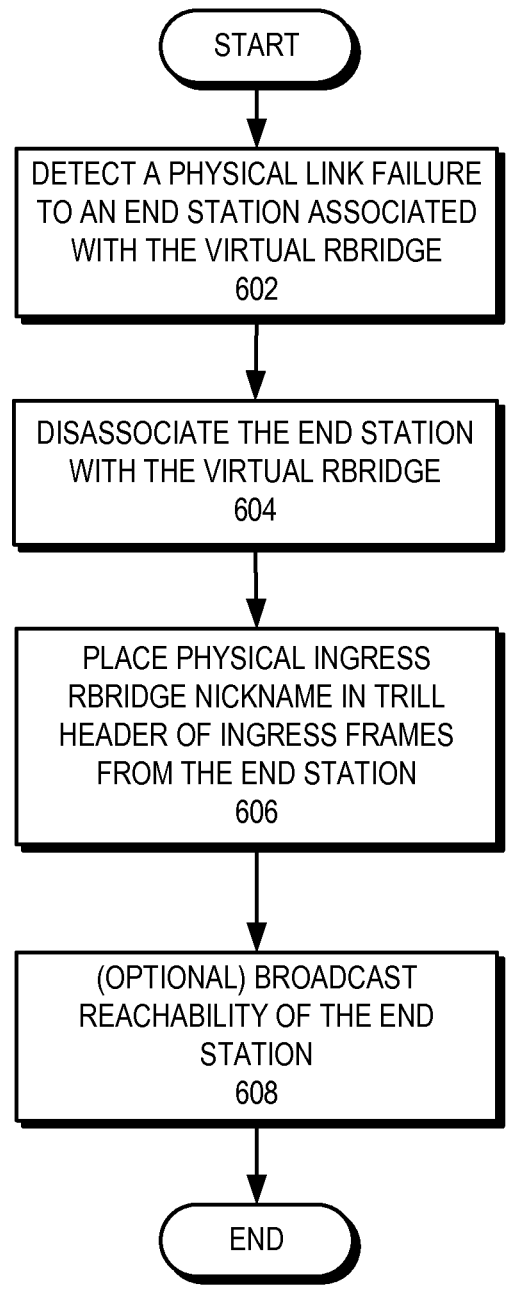
FIG. 6 presents a flowchart illustrating the process of handling a link failure that affects an end station associated with a virtual RBridge, in accordance with an embodiment of the present invention.

FIG. 6 presents a flowchart illustrating the process of handling a link failure that affects an end station associated with a virtual RBridge, in accordance with an embodiment of the present invention. During operation, a partner RBridge detects a physical link failure to an end station associated with the virtual RBridge (operation 602). The RBridge then disassociates the end station with the virtual RBridge (operation 604), and returns to the normal forwarding and/or flooding operation as for non-trunked ports. Furthermore, the RBridge places its own nickname (i.e., the physical ingress RBridge's nickname) in the source RBridge field in the TRILL header of ingress frames from the end station (operation 606). Optionally, the RBridge can broadcast the MAC reachability of the end station via its own RBridge identifier to other RBridges in the TRILL network (operation 608).

Multi-Pathing

Embodiments of the present invention can also facilitate equal-cost or nearly-equal-cost multi-pathing. Take the network topology in FIG. 1 for example. Assume that end station 112 is in communication with end station 114. The shortest path traverses RBridge 104 and RBridge 103. As a result, traffic from end station 114 to end station 112 (which is destined to virtual RBridge 108) would always go through RBridge 104, instead of being split between RBridge 105 and RBridge 104.

In one embodiment, if traffic splitting is desired, the partner RBridges can advertise to the rest of the TRILL network that virtual RBridge 108 is equal to RBridge 104 and RBridge 105, e.g., via a message indicating $RB_x \rightarrow \{RB_2\}$, where $RB_x$ denotes the virtual RBridge nickname, and $RB_1$ and $RB_2$ denote the physical RBridge nicknames. This can be done using control messages supported by existing routing protocols, such as the IS-IS protocol. As a result, for a given set of data flows, RBridge 103 can select RBridge 104 as the egress RBridge, whereas for other flows RBridge 103 can select RBridge 105 as the egress RBridge.

Exemplary Switch System

Figure 7:
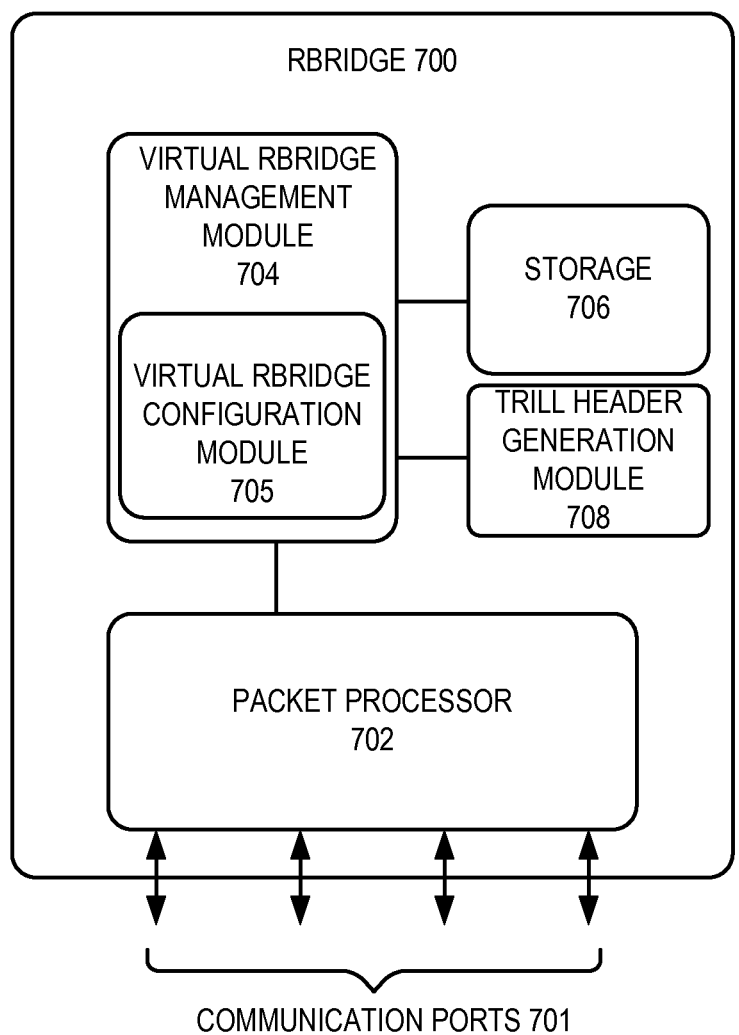
FIG. 7 illustrates an exemplary architecture of a switch that facilitates assignment of a virtual RBridge ID, in accordance with an embodiment of the present invention.

FIG. 7 illustrates an exemplary architecture of a switch that facilitates assignment of a virtual RBridge ID, in accordance with an embodiment of the present invention. In this example, an RBridge 700 includes a number of communication ports 701, a packet processor 702, a virtual RBridge management module 704, a virtual RBridge configuration module 705, a storage device 706, and a TRILL header generation module 708. During operation, communication ports 701 receive frames from (and transmit frames to) the end stations. Packet processor 702 extracts and processes the header information from the received frames. Packet processor 702 further performs routing on the received frames based on their Ethernet headers, as described in conjunction with FIG. 2. Note that communication ports 701 include at least one inter-switch communication channel for communication with one or more partner RBridges. This inter-switch communication channel can be implemented via a regular communication port and based on any open or proprietary format. Furthermore, the inter-switch communication between partner RBridges is not required to be direct port-to-port communication. Virtual RBridge management module 704 manages the communication with the partner RBridges and handles various inter-switch communication, such as MAC address information sharing and link failure notification.

Virtual RBridge configuration module 705 allows a user to configure and assign the identifier for the virtual RBridges. In one embodiment, virtual RBridge configuration module 705 derives a virtual RBridge ID from a LAG ID which is obtained during the link discovery and configuration process. It is also responsible for communicating with the partner RBridge(s) to share each other's MAC address reachability information, which is stored in storage 706. Furthermore, TRILL header generation module 708 generates the TRILL header for ingress frames corresponding to the virtual RBridge. Note that the above-mentioned modules can be implemented in hardware as well as in software. In one embodiment, these modules can be embodied in computer-executable instructions stored in a memory which is coupled to one or more processors in RBridge 700. When executed, these instructions cause the processor(s) to perform the aforementioned functions.

In summary, embodiments of the present invention provide a method and system for facilitating link aggregation across different switches in a routed network. In one embodiment, a virtual RBridge is formed to accommodate an aggregate link from an end station to multiple physical RBridges. The virtual RBridge is used as the ingress RBridge for ingress frames from the end station. Such configuration provides a scalable and flexible solution to link aggregation across multiple switches.

The methods and processes described herein can be embodied as code and/or data, which can be stored in a computer-readable nontransitory storage medium. When a computer system reads and executes the code and/or data stored on the computer-readable nontransitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch, comprising:
   processing circuitry;
   a storage device coupled to the processing circuitry and storing instructions which when executed by the processing circuitry cause the processing circuitry to perform a method, the method comprising:
   operating the switch in conjunction with a separate physical switch as a single logical switch;
   deriving a virtual switch identifier based on an identifier for a link aggregation group;
   assigning the virtual switch identifier to the logical switch; and
   marking an ingress-switch field of a frame with the virtual switch identifier;
   wherein the switch is capable of routing layer-2 frames without requiring a spanning-tree network topology.

2. The switch of claim 1, wherein the switch is configurable to operate in accordance with at least one of:
   a Transparent Interconnection of Lots of Links (TRILL) protocol;
   an Internet Protocol (IP); and
   a Multiprotocol Label Switching (MPLS) protocol.

3. The switch of claim 1, wherein the marking the ingress-switch field of the frame comprises determining the virtual switch identifier based on an input port on which the frame is received.

4. The switch of claim 1, wherein the virtual switch identifier is a virtual RBridge identifier in compliance with a TRILL protocol.

5. The switch of claim 1, wherein the link aggregation group is identified by a link aggregation group (LAG) identifier in accordance with the IEEE 802.1ax standard.

6. The switch of claim 1, wherein the method further comprises advertising to a neighbor a zero-cost link from the switch to the logical switch.

7. The switch of claim 6, wherein the method further comprises:
   detecting a failure of a link between the device and the separate physical switch; and
   disassociating the device from the virtual switch.

8. The switch of claim 6, wherein the method further comprises:
   detecting a failure of a link between the device and the switch; and
   notifying the separate physical switch of the failure.

9. The switch of claim 1, wherein the method further comprises notifying the separate physical switch about the reachability of a device coupled to the switch.

10. The switch of claim 1, wherein the method further comprises advertising that the virtual switch is equivalent to both the switch and the separate physical switch, thereby facilitating multi-path routing to or from a device coupled to both switches.

11. A non-transitory storage medium storing instructions which when executed by a computer system within a switch cause the computer system to perform a method, the method comprising:
    operating the switch in conjunction with a separate physical switch as a single logical switch;
    deriving a virtual switch identifier based on an identifier for a link aggregation group;
    assigning the virtual switch identifier to the logical switch; and
    marking an ingress-switch field of a frame with the virtual switch identifier;
    wherein the switch is capable of routing layer-2 frames without requiring a spanning-tree network topology.

12. The non-transitory storage medium of claim 11, wherein the method further comprises operating the switch in accordance with at least one of: a Transparent Interconnection of Lots of Links (TRILL) protocol; an Internet Protocol (IP); and a Multiprotocol Label Switching (MPLS) protocol.

13. The non-transitory storage medium of claim 11, wherein the marking the ingress-switch field of the frame comprises determining the virtual switch identifier based on an input port on which the frame is received.

14. The non-transitory storage medium of claim 11, wherein the virtual switch identifier is a virtual RBridge identifier in compliance with the TRILL protocol.

15. The non-transitory storage medium of claim 11, wherein the link aggregation group is identified by a link aggregation group (LAG) identifier in accordance with the IEEE 802.1ax standard.

16. The non-transitory storage medium of claim 11, wherein the method further comprises advertising to a neighbor a zero-cost link from the switch to the logical switch.

17. The non-transitory storage medium of claim 16, wherein the method further comprises:
    detecting a failure of a link between the device and the separate physical switch; and
    disassociating the device from the virtual switch.

18. The non-transitory storage medium of claim 16, wherein the method further comprises:
    detecting a failure of a link between the device and the switch; and
    notifying the separate physical switch of the failure.

19. The non-transitory storage medium of claim 11, wherein the method further comprises notifying the separate physical switch about the reachability of a device coupled to the switch.

20. The non-transitory storage medium of claim 11, wherein the method further comprises advertising that the virtual switch is equivalent to both the switch and the separate physical switch, thereby facilitating multi-path routing to or from a device coupled to both switches.

* * * * *